(12) United States Patent
Deokar et al.

(10) Patent No.: US 11,037,589 B1
(45) Date of Patent: Jun. 15, 2021

(54) MULTI-PIECE HEAD GIMBAL ASSEMBLY

(71) Applicant: Seagate Technology LLC, Fremont, CA (US)

(72) Inventors: Rohit Deokar, Eden Prairie, MN (US); Razman Zambri, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/888,034

(22) Filed: May 29, 2020

(51) Int. Cl.
*G11B 5/48* (2006.01)

(52) U.S. Cl.
CPC .......... *G11B 5/4833* (2013.01); *G11B 5/4826* (2013.01); *G11B 5/4853* (2013.01)

(58) Field of Classification Search
None
See application file for complete search history.

(56) References Cited

U.S. PATENT DOCUMENTS

| | | | | |
|---|---|---|---|---|
| 5,920,444 | A * | 7/1999 | Heeren et al. | G11B 5/4826 360/245.2 |
| 7,595,963 | B1 * | 9/2009 | Chen et al. | G11B 5/4853 360/245.9 |
| 8,085,508 | B2 | 12/2011 | Hatch | |
| 8,130,470 | B2 | 3/2012 | Muraki et al. | |
| 8,797,690 | B2 | 8/2014 | Tao et al. | |
| 9,190,086 | B1 | 11/2015 | Ee et al. | |
| 2001/0050828 | A1 * | 12/2001 | Davis et al. | G11B 5/4833 360/245.3 |
| 2008/0239577 | A1 * | 10/2008 | Zeng et al. | G11B 5/4826 360/245.1 |
| 2008/0266714 | A1 * | 10/2008 | Feng et al. | G11B 5/4853 360/234.6 |
| 2011/0096438 | A1 * | 4/2011 | Takada et al. | G11B 5/4853 360/245.3 |
| 2014/0022670 | A1 * | 1/2014 | Takikawa et al. | G11B 5/4826 360/234.4 |
| 2014/0078621 | A1 * | 3/2014 | Miller et al. | G11B 5/4826 360/245.3 |
| 2014/0168813 | A1 * | 6/2014 | Tao et al. | G11B 5/4826 360/234.6 |
| 2016/0267928 | A1 | 9/2016 | Kuwajima et al. | |

* cited by examiner

*Primary Examiner* — Craig A. Renner

(57) ABSTRACT

A head gimbal assembly for a hard disk drive includes a slider, a load beam, a gimbal, and a flexure. The gimbal is disposed between the load beam and the slider. The gimbal is configured to provide motive support to the slider as the slider moves in proximity to a media surface. The flexure is disposed between the gimbal and the slider. The flexure includes an electrical trace ribbon configured to provide electrical signal pathways to and from active components of the head gimbal assembly.

16 Claims, 7 Drawing Sheets

MULTI-PIECE HEAD GIMBAL ASSEMBLY

TECHNICAL FIELD

The disclosure relates to a head gimbal assembly for a hard disk drive.

BACKGROUND

Hard disk drives utilize one or more magnetic recording heads fabricated on sliders to read and write data on magnetic storage media. Typically, a slider is mounted on a trace gimbal assembly (TGA), collectively known as a head gimbal assembly (HGA). The TGA suspends the slider on a thin cushion of air or gas just above the surface of the magnetic storage media. In some examples, if the frequency of mechanical vibrations experienced by the HGA matches the natural resonance frequency modes of the HGA, the slider may experience undesired off-track movement and incorrectly read and/or write data from or to the magnetic storage media. Exciting a resonance frequency mode of the HGA may also potentially damage the slider or other components of the HGA, such as a micro-actuator.

SUMMARY

The present disclosure relates to aspects of a HGA configured to movably support a slider within a hard disk drive (HDD). In some examples, the disclosure describes a HGA that includes a load beam, a flexure, a gimbal, and a slider, where the flexure and the gimbal are stacked on top of one another. The flexure includes an electrical trace ribbon which electrically couples the slider to a drive controller. In one example, the gimbal is disposed between the load beam and the flexure. The gimbal is configured to provide structural support to the slider and, in combination with forces exerted on the slider by the load beam and an active air bearing (AAB), guide the motion of the slider during the operation of the HDD.

In contrast to some examples where the flexure and gimbal form a single, integrated piece, separating and stacking the flexure and the gimbal may enable the gimbal to be narrower than the flexure, and in some examples may enable the gimbal to be designed with a higher stiffness than that of an integrated flexure/gimbal piece. This increase in stiffness may increase the frequencies of some resonance modes of the HGA. The increased stiffness of the gimbal may also reduce the amplitude of the response of the HGA to certain resonance modes or may remove certain resonance modes completely. Controlling the resonance modes of the HGA by means of a separate flexure and gimbal may improve the ability of the HGA to accurately position the slider, which may enable the magnetic recording head of the slider to more accurately read and write data from and to the magnetic storage media. Controlling the resonance modes of the HGA may, in some scenarios, reduce the likelihood of damaging the slider or other components of the HGA, which may improve longevity and/or reliability of the hard drive.

In one example, a head gimbal assembly includes a slider; a load beam; a gimbal disposed between the load beam and the slider, the gimbal configured to provide motive support to the slider as the slider moves in proximity to a media surface; and a flexure disposed between the gimbal and the slider, the flexure comprising an electrical trace ribbon configured to provide electrical signal pathways to and from active components of the head gimbal assembly.

These and other features and aspects of various examples may be understood in view of the following detailed discussion and accompanying drawings.

DETAILED DESCRIPTION

Figure 1:
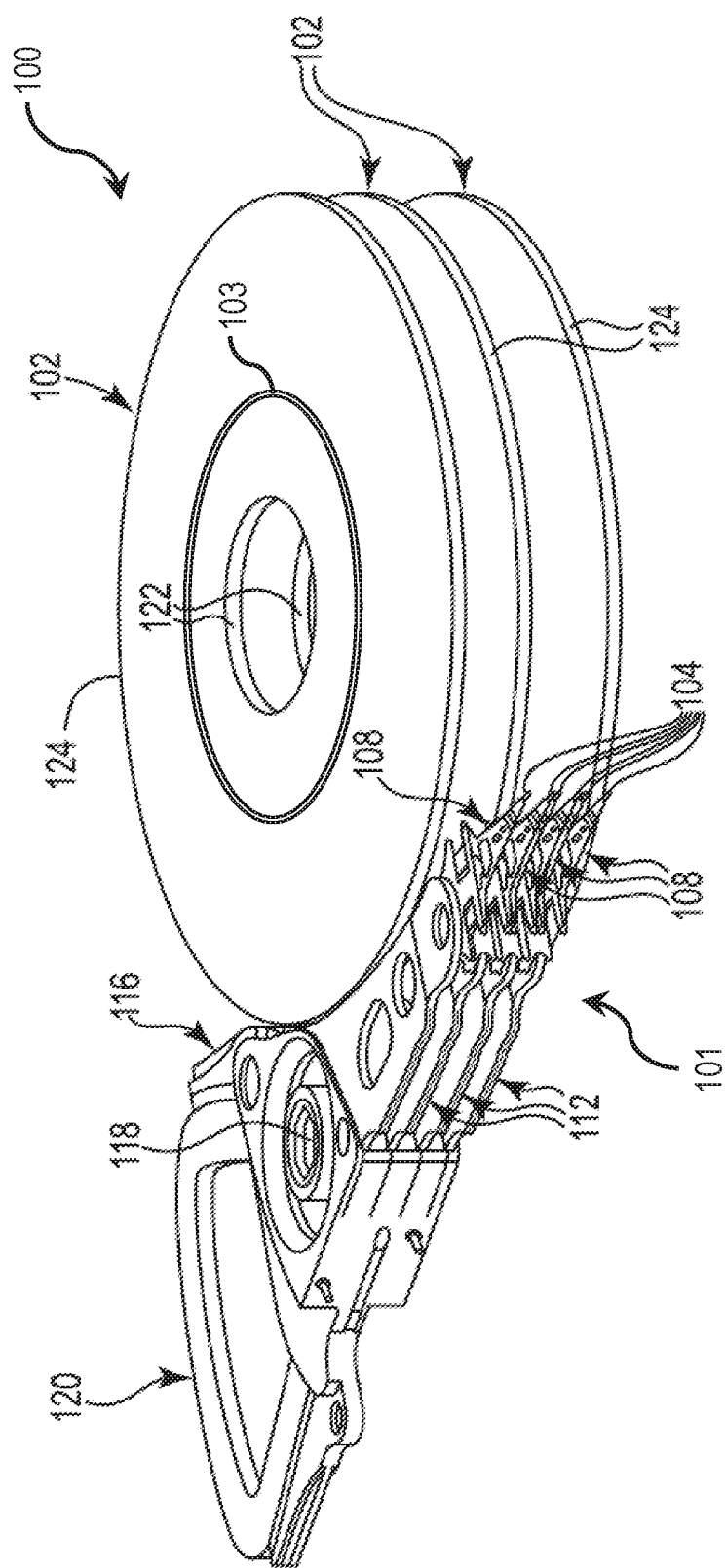
FIG. 1 is a perspective view of an example hard disk drive, in accordance with aspects of this disclosure.

FIG. 1 is a perspective view of an example hard disk drive (HDD), in accordance with aspects of this disclosure. HDD 100 includes a head stack assembly 101 and media 102. In one example, media 102 includes magnetic disks that each store information as domains in a plurality of circular, concentric data tracks 103.

Head stack assembly 101 includes a voice coil drive actuator 120, an actuator mechanism 116, a shaft 118, a plurality of rotatable drive actuator arms 112, and a plurality of head gimbal assemblies 108. Voice coil drive actuator 120 is controlled by servo control circuitry (or "controller," as used herein). Voice coil drive actuator 120 is configured to rotate actuator mechanism 116 about shaft 118 in either rotational direction. Rotatable drive actuator arms 112 are each coupled to a respective HGA of HGAs 108, such that rotating actuator mechanism 116 causes rotatable drive actuator arms 112 and HGAs 108 to move relative to media 102. Each HGA 108 includes a respective slider 104. Positioning HGAs 108, and thus sliders 104, over the disk surfaces of media 102 between inner diameters 122 and outer diameters 124 of media 102 enables sliders 104 to read data from and write data to media 102. In some examples, sliders 104 are themselves aerodynamically designed to fly on an active air bearing that is created adjacent to each disk surface during disk rotation.

Figure 2:
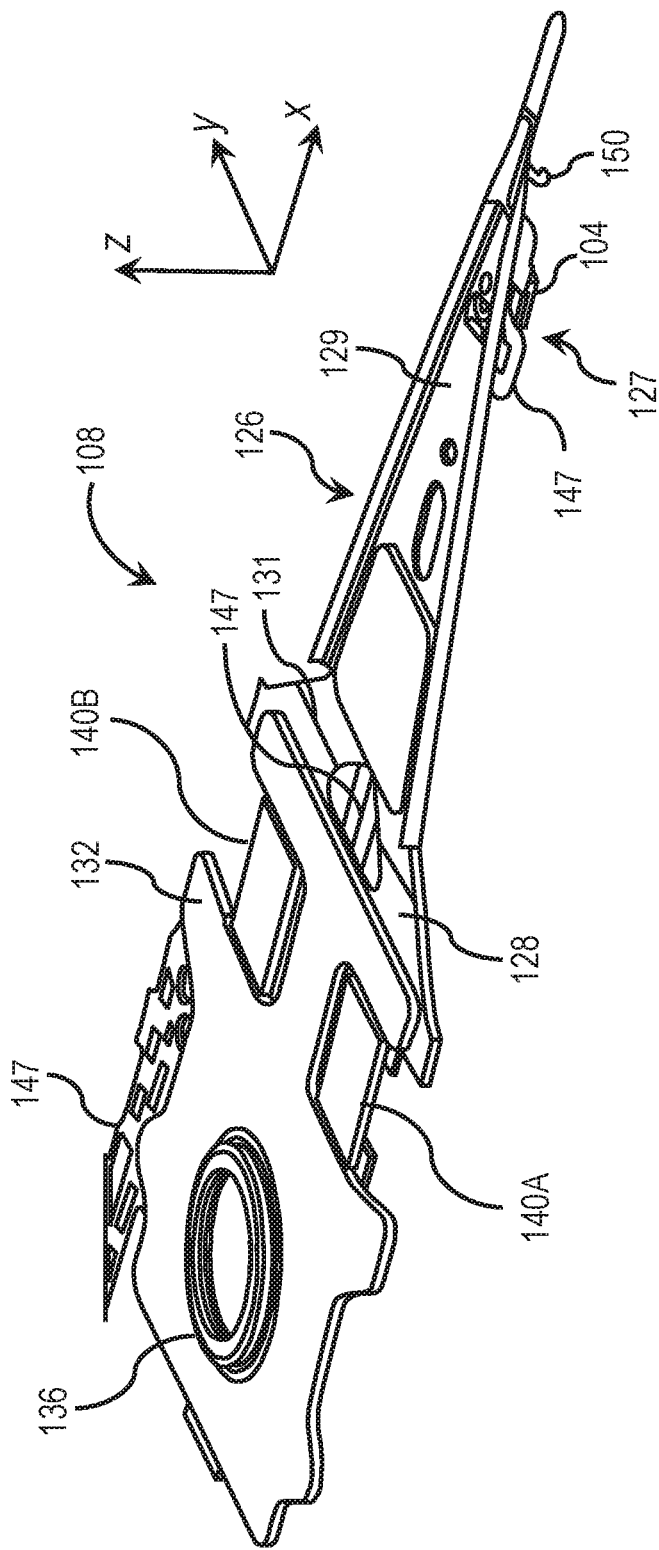
FIG. 2 is a perspective view of an example HGA, in accordance with aspects of this disclosure.

FIG. 2 is a perspective view of HGA 108 of FIG. 1, according to various aspects of this disclosure. HGA 108 includes a load beam 126, a flexure 127, a baseplate 132, a gimbal 150, and a slider 104.

Baseplate 132 may include an attachment structure 136, such as a boss tower, that is configured to couple to one of the plurality of rotatable drives actuator arms 112 of FIG. 1. In one example, attachment structure 136 is integrally formed with baseplate 132. Baseplate 132 and attachment structure 136 may each be made of a ferrite (e.g., stainless steel) or other suitable material (e.g., aluminum, engineered plastic, and the like).

In one example, load beam 126 includes a base portion 128, a hinge region 131, and a rigid region 129. In the example of FIG. 2, base portion 128 of load beam 126 is mechanically coupled to baseplate 132. In some examples, base portion 128 is coupled to baseplate 132 via welding (e.g., laser welding). In some examples, hinge region 131 is integrated with and contiguous with load beam 126 as a single part. Rigid region 129 of load beam 126 may extend from hinge region 131 to the tip of HGA 108. In other words, in the example of FIG. 2, hinge region 131 is disposed between base portion 128 and rigid region 129.

Flexure 127 is configured to provide a surface for mounting slider 104 to HGA 108 and electrically couple slider 104 to a drive controller. In the example of FIG. 2, flexure 127 includes an electrical trace ribbon 147 which is configured to provide electrical signal pathways to and from active components of HGA 108. Examples of active components of HGA 108 include readers, writers, and heaters of the magnetic recording head of slider 104, and microactuators of flexure 127. In some examples, electrical trace ribbon 147 is a multilayer composite of one or more conductive layers and one or more insulating layers. The conductive layers may be made of copper, aluminum, tin or other suitable material. The insulating layers may be made of polyimide, glass fiber epoxy laminate, PTFE or other suitable material. Electrical trace ribbon 147 may include any number of conductors which may be electrically coupled to slider 104, one or more microactuators of flexure 127, and/or other active components.

In the example of FIG. 2, HGA 108 includes microactuators 140A and 140B (collectively, microactuators 140). Microactuators 140 may provide increased control for positioning slider 104 over a media surface. In one example, microactuators 140 are coupled to the baseplate 132. Microactuators 140 may be piezoelectric microactuators, and in some examples may be made of lead zirconate titanate (PZT). Microactuators 140 expand and contract to move the slider 104 over a media surface. This movement can be used to provide a secondary finer resolution level of tracking of slider 104, such as tracking of a slider 104 relative to data tracks 103 of FIG. 1, supplementing the tracking provided by voice coil drive actuator 120 and actuator mechanism 116 of FIG. 1 as discussed previously. The additional resolution provided by microactuators 140 may enable data tracks on a media surface to be closer to one another, thereby potentially increasing the areal density capability of an HDD.

Slider 104 is suspended in proximity to a media surface and is supported by load beam 126, flexure 127, and gimbal 150. Load beam 126 exerts a force, known as the preload force, on slider 104 through rigid region 129 of load beam 126. The preload force urges slider 104 toward the media surface. An opposing force directed away from the media surface is exerted on slider 104 by a cushion of air, helium or other gas proximal to an outer surface of slider 104 which is facing the media surface. This cushion of gas, known as an active air bearing (AAB), is produced from a dynamic flow of gas across a pattern of recessed sub-surfaces bound within the volume of slider 104 by the outer surface of slider 104 which is facing the media surface. The force of the AAB on slider 104 in a direction facing away from the media surface is countered by the preload force exerted on slider 104 by load beam 126. These opposing forces maintain slider 104 at a passive fly height above the media surface as the media is rotating. The writers and readers of a magnetic recording head of slider 104 further protrude from the media facing surface of slider 104 toward the media surface with assistance from active heaters of the magnetic recording head. These protrusions are controlled to maintain slider 104 at a desired active fly height during read and write operations.

Figure 3:
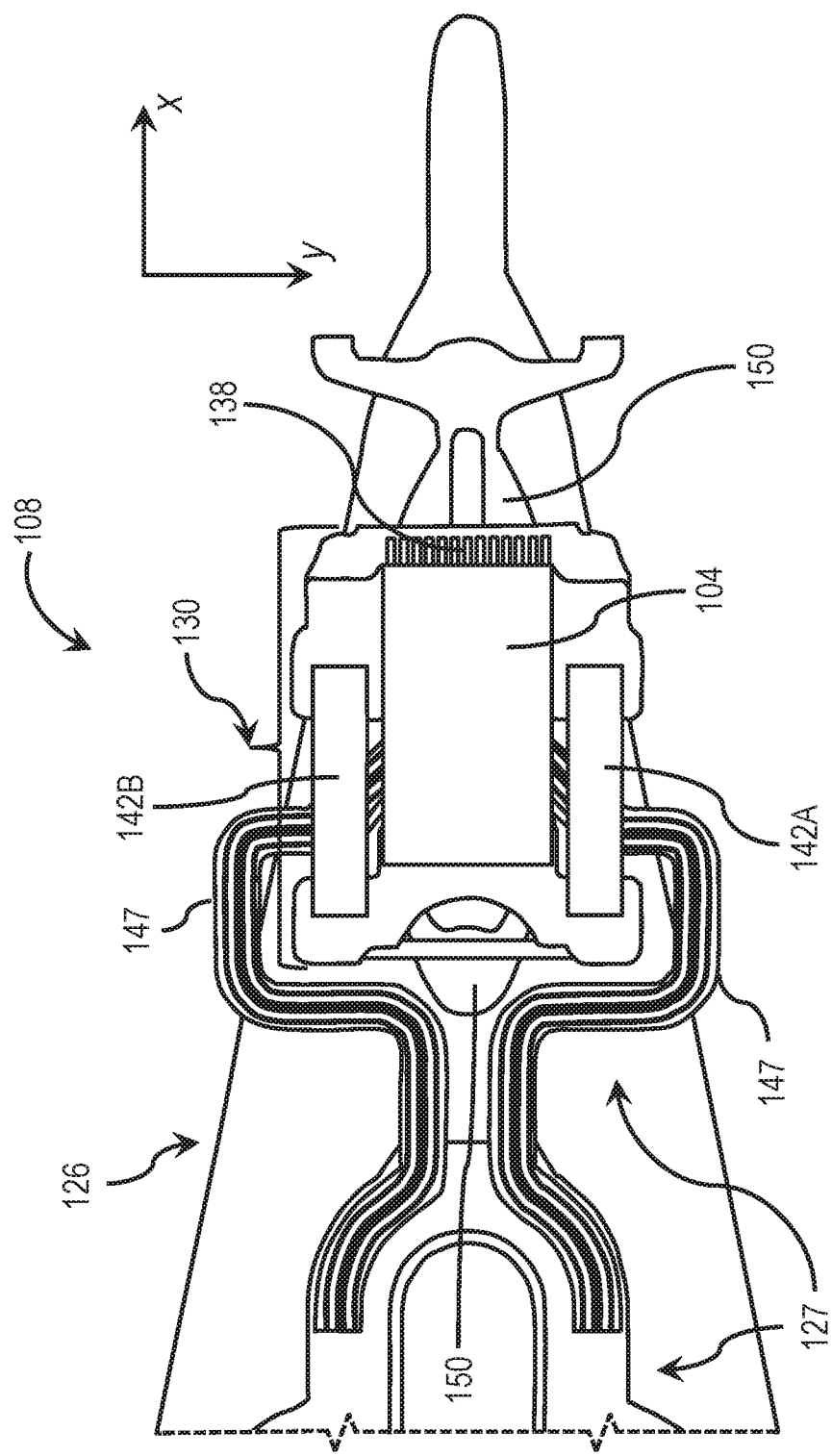
FIG. 3 is a partial bottom-up view of an example HGA, in accordance with aspects of this disclosure.

FIG. 3 is a partial bottom-up view of HGA 108, according to various aspects of this disclosure. In the example of FIG. 3, electrical trace ribbon 147 includes conductors that run alongside each side of flexure 127 to extend to a slider support region 130 of flexure 127. Slider support region 130 of flexure 127 is configured to provide a surface for mounting slider 104 to flexure 127. Slider support region 130 may also be configured to couple gimbal 150 to flexure 127. In the example of FIG. 3, gimbal 150 is disposed between load beam 126 and slider support region 130 of flexure 127. In some examples, slider support region 130 may include one or more rigid pieces which may be made of metal, such as stainless steel, aluminum, or other metal. Slider support region 130 may include one or more flexible pieces, and, in some examples, layers of flexible and/or rigid pieces. In some examples, the pieces of slider support region 130 may be made of polymer, ceramic, or may be a layered laminate structure of metal, polymer, and/or ceramic materials. Slider 104 may be mounted to slider support region 130 using adhesive, epoxy, or other appropriate means of coupling an electrical component to a substrate.

According to the example of FIG. 3, slider support region 130 includes bondpads 138 for electrically coupling electrical trace ribbon 147 to slider 104. An end of electrical trace ribbon 147 may terminate on slider support region 130 and may be electrically coupled to bondpads 138. A conductive junction such as solder contact may be formed between a bondpad located on slider 104 and a corresponding bondpad of bondpads 138 on slider support region 130 of flexure 127. In some instances, a plurality of bondpads are used to couple conductors of electrical trace ribbon 147 to the active components of slider 104. In some examples, the end of electrical trace ribbon 147 which is opposite the end terminating on slider support region 130 is coupled to a component of the drive controller (not shown).

Flexure 127 may, in some scenarios, include microactuators 142A and 142B (collectively, microactuators 142) which are configured to provide fine resolution positioning of slider 104 over a media surface during the reading and writing of data tracks. In the example of FIG. 3, microactuators 142 are coupled to slider support region 130 of flexure 127. Microactuators 142 may expand and contract to induce motion of slider 104 in the x-y plane of FIG. 3. Such motion may provide fine positioning resolution of a magnetic recording head during reading and writing data tracks, such as the positioning of a magnetic recording head of slider 104 over data tracks 103 of FIG. 1. In some examples, microactuators 142 may be used in conjunction with microactuators which are coupled to a baseplate of HGA 108, such as microactuators 140 of FIG. 2. A combination of microactuators coupled to a baseplate, as in the example of microactuators 140 coupled to baseplate 132 in FIG. 2, and microactuators coupled to a flexure, as in the example of microactuators 142 coupled to slider support region 130 of flexure 127 in FIG. 3, may provide finer positioning resolution of a magnetic recording head over data tracks of a media surface than would be achievable for an HGA containing a single set of microactuators or no microactuators.

Figure 4A:
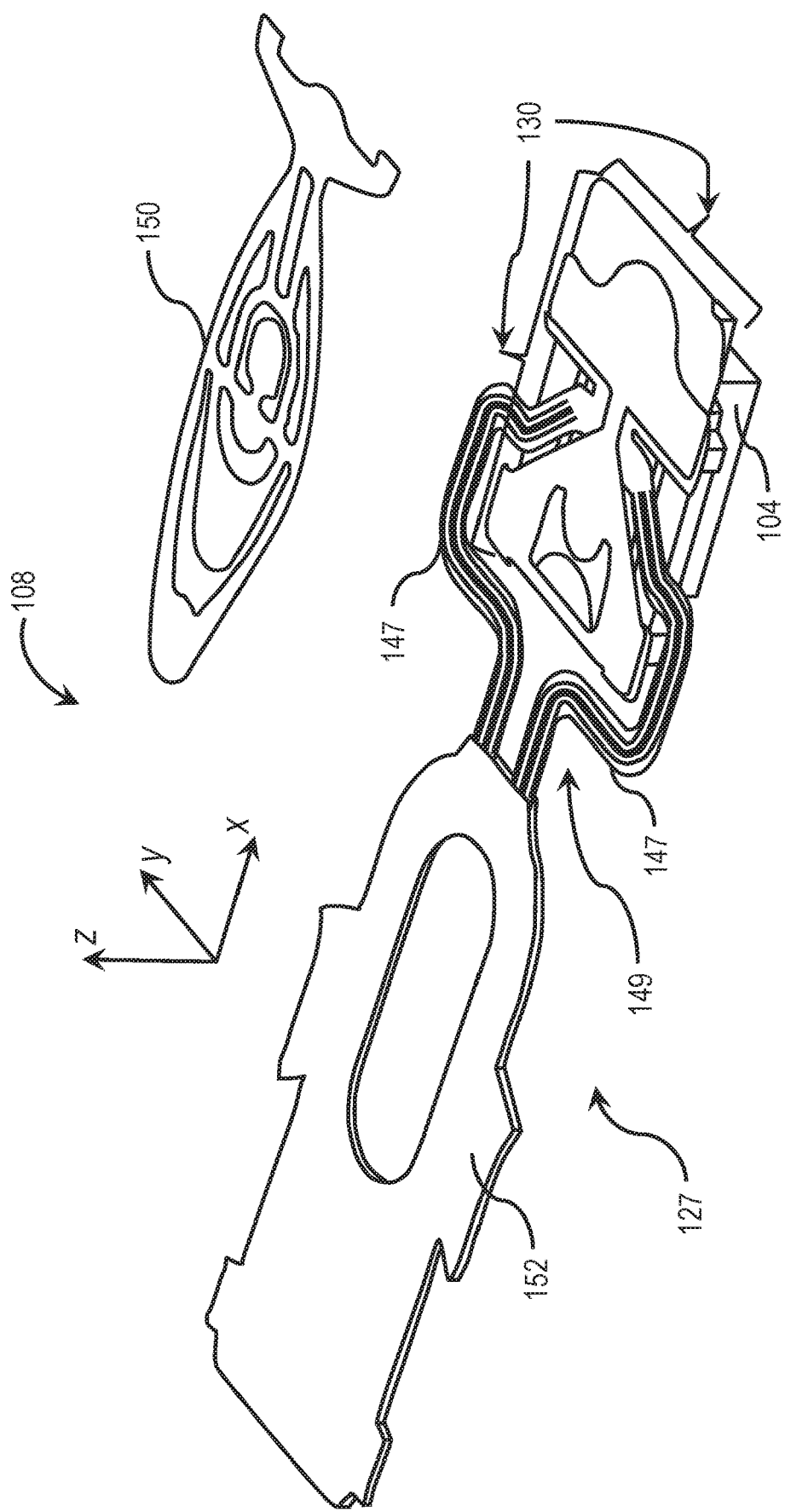
FIG. 4A is an exploded perspective view of an example HGA, in accordance with aspects of this disclosure.

FIG. 4A is an exploded perspective view of HGA 108, in accordance with aspects of this disclosure. In the example of FIG. 4A, gimbal 150 is a separate piece from flexure 127. Gimbal 150 is configured to provide motive support to slider 104 as slider 104 moves in proximity to a media surface. Gimbal 150 is, in some examples, a rigid structure that includes a network of slots and beams. In one example, gimbal 150 is made of one or more metals (e.g., stainless steel), metal alloys, ceramic materials, polymeric materials, composite materials, or other structural materials.

In the example of FIG. 4A, flexure 127 includes a rigid support piece 152 and slider support region 130. Rigid support piece 152 is configured to provide a region of mechanical support for a portion of electrical trace ribbon 147. In some instances, rigid support piece 152 serves as a mechanically rigid region to couple flexure 127 to load beam 126 of FIG. 3. Slider support region 130 of FIG. 4A is configured to provide surfaces for mounting slider 104 and gimbal 150 to flexure 127. Slider 104 of FIG. 4A is coupled to a bottom surface of slider support region 130 of flexure 127.

In some examples, electrical trace ribbon 147 bridges rigid support piece 152 and slider support region 130 across a sag bend 149. Electrical trace ribbon 147 may include one or more flexible materials. Electrical trace ribbon 147 includes, in some examples, a flexible laminate structure. Electrical trace ribbon 147 may terminate on slider support region 130 of flexure 127.

Figure 4B:
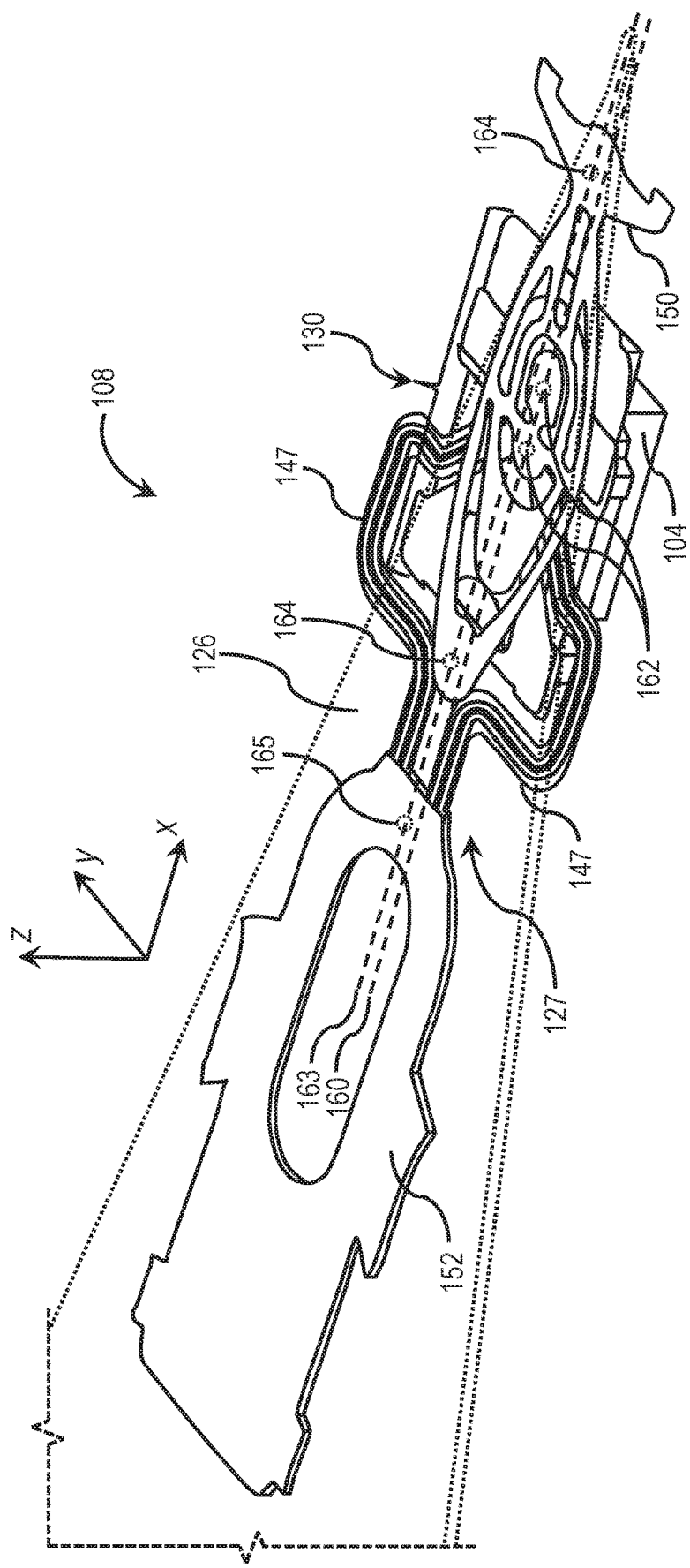
FIG. 4B is a perspective view of an example HGA, in accordance with aspects of this disclosure.

FIG. 4B is a perspective view of HGA 108, in accordance with aspects of this disclosure. In the example of FIG. 4B, as in FIG. 4A, gimbal 150 is a separate piece from flexure 127. In contrast to examples where gimbal 150 and flexure 127 are integrally formed from the same material in the same plane as one another, utilizing a separate gimbal 150 and flexure 127 enables gimbal 150 and flexure 127 to be stacked on top of one another. For example, as illustrated in FIG. 4B, gimbal 150 is stacked on top of flexure 127 and coupled to flexure 127.

In one example, a bottom surface of gimbal 150 is coupled to a top surface of flexure 127. The bottom surface of gimbal 150 may be coupled to a top surface of slider support region 130 of flexure 127. A top surface of slider 104 is coupled to a bottom surface of slider support region 130. A top surface of gimbal 150 is coupled to a bottom surface of load beam 126, a portion of load beam 126 shown by the dotted line in FIG. 4B. In other words, gimbal 150 is disposed between load beam 126 and slider 104, and flexure 127 is disposed between gimbal 150 and slider 104.

As used herein, centerline 160 of FIG. 4B is a line dividing flexure 127 and slider support region 130 in halves in the x-direction. In some scenarios, the portions of flexure 127 and slider support region 130 on one side of centerline 160 are mirror images of the portions of flexure 127 and slider support region 130 on the other side of centerline 160. In the example of FIG. 4B, centerline 160 divides flexure 127, slider support region 130, and gimbal 150 in halves in the x-direction, such that centerline 160 is a centerline of flexure 127, slider support region 130, and gimbal 150.

As used herein, centerline 163 is a line dividing gimbal 150 in half in the x-direction. In some examples, the portion of gimbal 150 on one side of centerline 163 is a mirror image of the portion of gimbal 150 on the other side of centerline 163. In the example of FIG. 4B, centerline 163 divides both gimbal 150 and load beam 126 in halves in the x-direction, thus making centerline 163 a centerline of both gimbal 150 and load beam 126. In some examples, centerline 163 divides gimbal 150, load beam 126, and rigid support piece 152 in respective halves in the x-direction, making centerline 163 of these examples a centerline of gimbal 150, load beam 126, and rigid support piece 152.

According to FIG. 4B, centerline 160 and centerline 163 are parallel lines in the x-direction of an x-z plane which divides HGA 108 into two equally sized halves along the x-direction of FIG. 4B. In this example, centerlines 160 and centerlines 163 are centerlines of HGA 108, load beam 126, gimbal 150, flexure 127, slider support region 130, and rigid support piece 152.

Gimbal 150 may be coupled to flexure 127 at a single location (e.g., on slider support region 130) or at a plurality of locations. In some instances, the bottom surface of gimbal 150 is coupled to the top surface of flexure 127 at locations 162 along centerline 160. In one example, the bottom surface of gimbal 150 is coupled to the top surface of slider support region 130 of flexure 127 at locations 162 along centerline 160, with centerline 160 being a centerline of flexure 127, slider support region 130, and gimbal 150.

Coupling between gimbal 150 and flexure 127 may include one or more welds. For instance, the bottom surface of gimbal 150 may be welded to the top surface of slider support region 130 of flexure 127 at one or more locations 162 along centerline 160 of FIG. 4B.

The top surface of gimbal 150 may be coupled to the bottom surface of load beam 126 at one or more locations 164 along centerline 163. A top surface of rigid support piece 152 of flexure 127 may be coupled to the bottom surface of load beam 126. In some examples, the top surface of rigid support piece 152 is coupled to the bottom surface of load beam 126 at one or more locations 165 along centerline 163. Coupling between gimbal 150 and load beam 126 may include one or more welds. In one example, the top surface of gimbal 150 is welded to the bottom surface of load beam 126 at locations 164 along centerline 163. Coupling between rigid support piece 152 and load beam 126 may include one or more welds at locations 165 along centerline 163. In some instances, coupling slider support region 130 of flexure 127 and gimbal 150 along centerline 160, coupling gimbal 150 and load beam 126 along centerline 163, and coupling rigid support piece 152 and load beam 126 along centerline 163, where centerline 160 and centerline 163 are parallel lines in the x-direction of an x-z plane which divides HGA 108 into two equally sized halves along the x-direction, may reduce the amplitude of off-track movement of slider 104 in response to vibrations at resonance modes of HGA 108.

In some examples, a maximum width of gimbal 150 in the y-direction is narrower than a maximum width of flexure 127. In the example of FIG. 4B, a maximum width of gimbal 150 in the y-direction is narrower than a width of flexure 127 in the y-direction in the area where gimbal 150 is stacked on top of flexure 127, that is, in a region of overlap of gimbal 150 and flexure 127. In one example, a maximum width of gimbal 150 in the y-direction is narrower than a width of slider support region 130 of flexure 127 in the y-direction in the area where gimbal 150 is stacked on top of slider support region 130 of flexure 127, that is, in a region of overlap of gimbal 150 and slider support region 130 of flexure 127. In some examples, the width of slider support region 130 of flexure 127 in the y-direction is a maximum outer width of slider support region 130. By separating gimbal 150 and flexure 127, the dimensions of gimbal 150 are not limited by the dimensions of flexure 127. That is, utilizing gimbal 150 and flexure 127 as separate pieces and stacking gimbal 150 and flexure 127 on top of one another enables gimbal 150 to be narrower than flexure 127 in a region where gimbal 150 is stacked on top of flexure 127. In this way, gimbal 150 can be designed independently of and without limitations from the dimensions of flexure 127. For example, the design of gimbal 150 can be tuned to remove and/or reduce the amplitude of certain resonance modes that may otherwise be present in HGAs that include a gimbal that is integrated into the flexure or load beam. Removing resonance modes or reducing the amplitude of resonance modes may reduce the risk of mistracking of the magnetic recording head, data loss and damage to the slider, magnetic recording head, and components of the HGA. In other words, removing or reducing the amplitude of the resonance modes may increase the reliability and/or longevity of the HDD.

Further, utilizing a gimbal 150 which is narrower than the portion of flexure 127 to which it is coupled may increase the resonance frequencies of characteristic modes of HGA 108. Increasing the resonance frequencies of the characteristic modes may reduce the risk of HGA 108 experiencing vibrations with frequencies matching the resonant frequencies, thereby potentially reducing the occurrence of off-track movement of slider 104 at characteristic resonance frequencies of HGA 108.

The shapes and positions of the slots and beams of gimbal 150 of FIG. 4A and FIG. 4B may be designed to reduce the resonance response of the natural vibrational modes of the associated HGA to sources of vibration which are present in the HDD, characterized by off-track movement of the slider. Additionally, gimbal 150 of FIG. 4A and FIG. 4B may be designed to increase the natural resonance frequencies of the associated HGA to provide a wider operating bandwidth. Reducing the amplitude of the off-track movement of the slider in response to vibrations may increase the capacity of the HDD by enabling narrower tracks to be written to a media surface.

Figure 5:
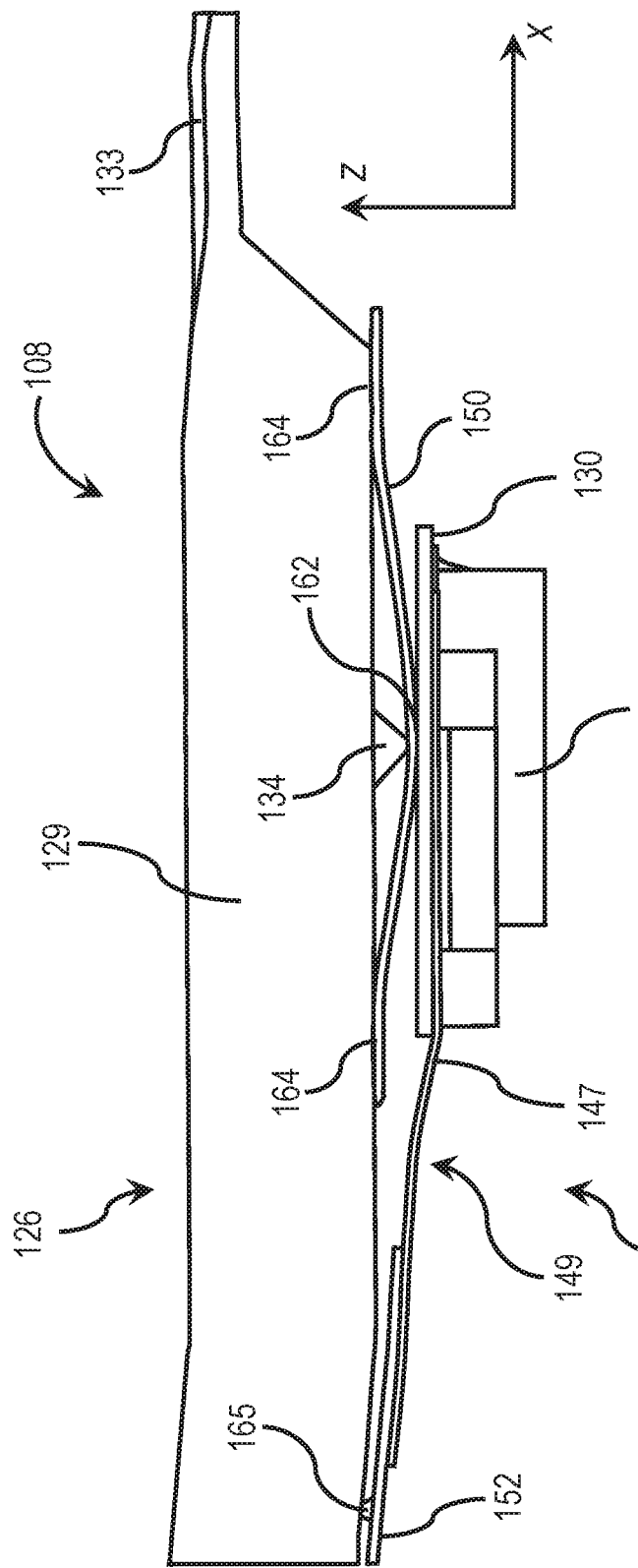
FIG. 5 is a cross-sectional view of an example HGA, in accordance with aspects of this disclosure.

FIG. 5 is a cross-sectional view of HGA 108, in accordance with aspects of this disclosure. In the example of FIG. 5, gimbal 150 is disposed between flexure 127 and rigid region 129 of load beam 126. Gimbal 150 is disposed, in some examples, between slider support region 130 of flexure 127 and rigid region 129 of load beam 126. In FIG. 5, the bottom surface of gimbal 150 is coupled to the top surface of slider support region 130 of flexure 127 (e.g., by welding) at a location 162. The top surface of gimbal 150 is coupled to the bottom surface of load beam 126 (e.g., by welding) at locations 164. In one example, the top surface of gimbal 150 is coupled to the bottom surface of load beam 126 within rigid region 129 of load beam 126. That is, in the example of FIG. 5, rigid region 129 of load beam 126, gimbal 150, slider support region 130 of flexure 127, and slider 104 are stacked in the z-direction.

Further contact between gimbal 150 and load beam 126 may, in some examples, occur at a dimple 134 on rigid region 129 of load beam 126, where dimple 134 protrudes from load beam 126 toward slider 104. Dimple 134 is configured to provide a pivot point for movement of slider 104 and transfer the preload force from load beam 126 to slider 104. Slider 104 may, in some scenarios, pivot about dimple 134 in the pitch, roll, and yaw directions. In some examples, dimple 134 provides a narrow region of contact with gimbal 150 or flexure 127. In the example of FIG. 5, a bottom surface of dimple 134 physically contacts the top surface of gimbal 150. In other examples of HGA 108 of FIG. 5, gimbal 150 includes an opening oriented with dimple 134, allowing the bottom surface of dimple 134 to physically contact a top surface of flexure 127, such as the top surface of slider support region 130.

In the example of FIG. 5, slider support region 130 is joined to rigid support piece 152 by a portion of electrical trace ribbon 147 across sag bend 149. In some scenarios, the top surface of rigid support piece 152 of flexure 127 is coupled to the bottom surface of load beam 126 at location 165. In this example, gimbal 150 is disposed between load beam 126 and flexure 127 in a region of HGA 108 which is proximal to a load beam tip 133. Coupling between gimbal 150 and load beam 126, and between gimbal 150 and slider support region 130 of flexure 127 is in the region of HGA 108 which is proximal to load beam tip 133, on the right of sag bend 149 according to FIG. 5. Rigid support piece 152 of flexure 127 is coupled to load beam 126 at location 165 in a region of HGA 108 which is distal to load beam tip 133, to the left of sag bend 149 according to the FIG. 5.

In the example of FIG. 5, motion of slider support region 130 of flexure 127, and thus slider 104, is mechanically supported by electrical trace ribbon 147 at sag bend 149, gimbal 150 and dimple 134. In some examples, electrical trace ribbon 147 is flexible and provides minimal structural support to slider support region 130 and slider 104. In such examples, the main mechanical support of slider 104 mounted to slider support region 130 comes from gimbal 150 and load beam 126, by way of dimple 134. In such cases, dimple 134 provides a region of pivot motion of slider 104 in the pitch, roll, and yaw directions, and gimbal 150 provides structural support for slider 104 as it pivots about dimple 134.

Gimbal 150 may be structurally designed to support the functional motion of slider 104 in the pitch, roll, and yaw directions while simultaneously reducing the amplitude of off-track movement of slider 104 in response to vibrations at resonance modes of HGA 108. Increasing the stiffness and narrowing the dimension of the gimbal 150 are two ways of reducing the normalized gain amplitude and increasing the frequencies of characteristic resonance modes of HGA 108. By separating gimbal 150 and flexure 127 and stacking them on top of one another, gimbal 150 may be designed independently of flexure 127 and load beam 126. In this way, the width of gimbal 150 may be smaller than the width of the regions of flexure 127 proximal to gimbal 150. In contrast to example HGAs which include a gimbal that is integrated into a flexure or a load beam, a separate gimbal, such as gimbal 150 of FIG. 5, may provide more freedom to design the dimensions and structure of the gimbal, and may result in reduced off-track motion of the slider in response to vibrations at resonance modes.

Figure 6:
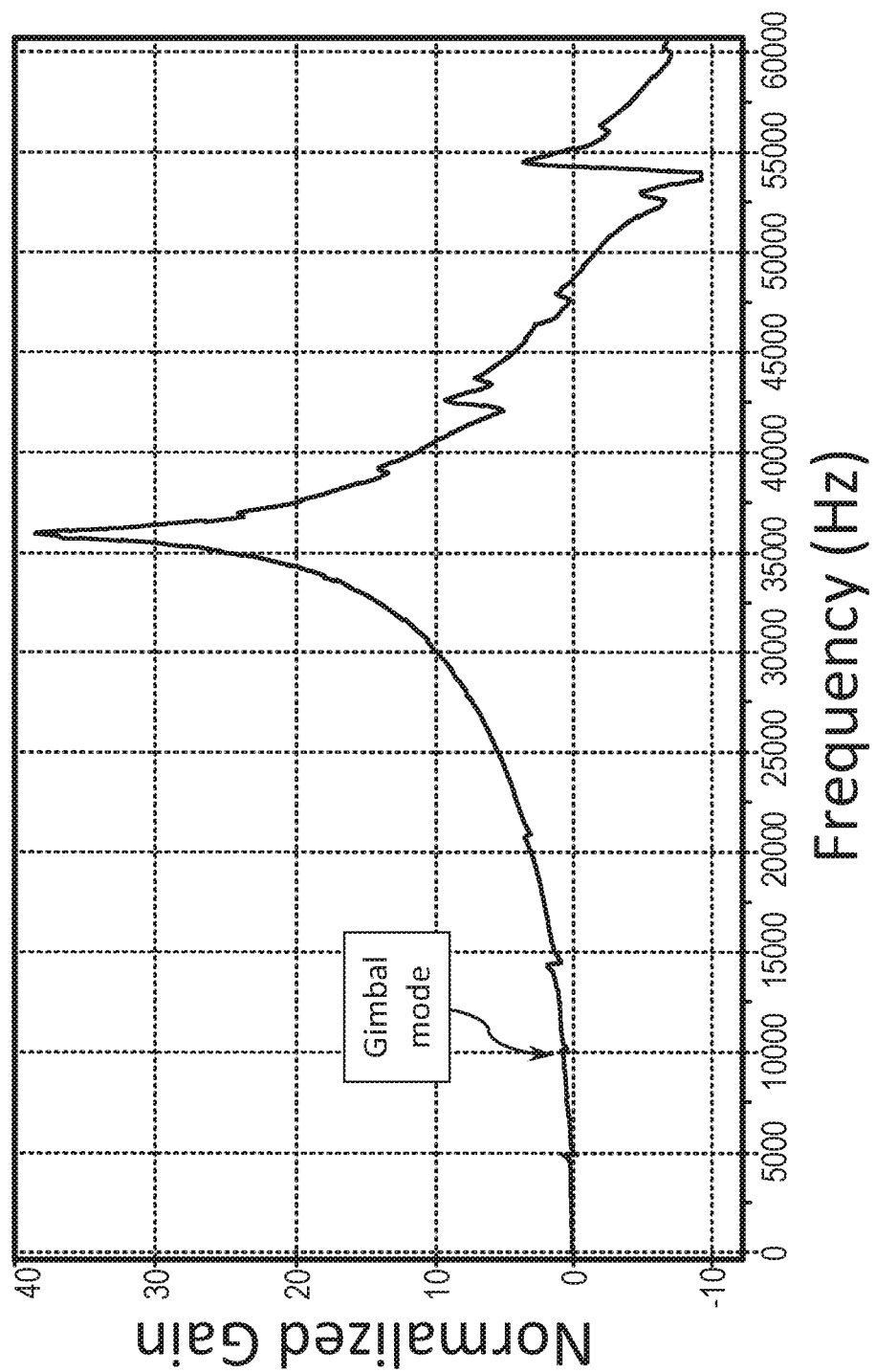
FIG. 6 is a plot of the normalized gain vs. frequency based on a simulation of an example HGA, in accordance with aspects of this disclosure.

FIG. 6 is a plot of the normalized gain vs. frequency based on a simulation of an example HGA, in accordance with aspects of this disclosure. Normalized gain of the y-axis in FIG. 6 represents potential amplitude of off-track movement of a slider in the presence of a vibrational frequency as represented on the x-axis of FIG. 6. As shown in FIG. 6, multiple peaks can be seen as specific frequencies, representing resonance modes of an HGA. In contrast to example HGAs that include a gimbal integrated with a flexure and have relatively high normalized gain peaks at frequencies less than approximately 20 k Hz, separating flexure 127 and gimbal 150 of FIG. 5 may reduce the normalized gain amplitude at characteristic resonance frequencies and/or shift the normalized gain peaks for characteristic resonance modes to higher frequencies (e.g., approximately 36 k Hz). Reducing the normalized gain amplitude at characteristic resonance frequencies may, in some scenarios, reduce the magnitude of off-track movement of a slider in the presence of vibrations at the resonance frequencies. In some examples, increasing the frequencies of the normalized gain peaks of characteristic resonance modes may reduce the rate of occurrence of off-track movement of the slider in the presence of vibrations. The occurrence of off-track movement of the slider may, in some scenarios, result in reliability issues such as data loss and/or damage to components of the HGA. Thus, an HGA design which includes a separate flexure and gimbal may, in some scenarios, have improved reliability in contrast to HGA design which includes a gimbal that is integrated with the flexure or load beam.

What is claimed is:

1. A head gimbal assembly for a hard disk drive, where the head gimbal assembly comprises:

a slider;

a load beam;

a gimbal disposed between the load beam and the slider, the gimbal configured to provide motive support to the slider as the slider moves in proximity to a media surface; and a flexure separate from the gimbal and disposed between the gimbal and the slider, the flexure comprising an electrical trace ribbon configured to provide electrical signal pathways to and from active components of the head gimbal assembly, wherein a top surface of the flexure is welded to a bottom surface of the gimbal and a bottom surface of the load beam, and wherein a top surface of the gimbal is welded to the bottom surface of the load beam.

2. The head gimbal assembly of claim 1, wherein the top surface of the flexure is welded to the bottom surface of the gimbal at a plurality of locations along a centerline of the flexure.

3. The head gimbal assembly of claim 2, wherein the centerline is a centerline of both the flexure and the gimbal.

4. The head gimbal assembly of claim 1, wherein the top surface of the gimbal is welded to the bottom surface of the load beam at a plurality of locations along a centerline of the gimbal.

5. The head gimbal assembly of claim 4, wherein the centerline is a centerline of both the gimbal and the load beam.

6. The head gimbal assembly of claim 1, wherein a bottom surface of the gimbal is welded to a top surface of the flexure at a first plurality of locations along a first centerline, wherein a top surface of the gimbal is welded to a bottom surface of the load beam at a second plurality of locations along a second centerline, wherein the first centerline is a centerline of the gimbal and the flexure, wherein the second centerline is a centerline of the gimbal and the load beam, and wherein the first centerline and the second centerline are parallel lines in an x-direction of an x-z plane which divides the head gimbal assembly into two equally sized halves along the x-direction.

7. The head gimbal assembly of claim 1, wherein a maximum width of the gimbal is narrower than a maximum width of the flexure.

8. The head gimbal assembly of claim 1, wherein a maximum width of the gimbal within a region of overlap of the gimbal and the flexure is narrower than a width of the flexure within the region of overlap of the gimbal and the flexure.

9. The head gimbal assembly of claim 1, the flexure further comprising a slider support region and a rigid support piece, wherein the slider support region is configured to provide a surface for mounting the slider to the flexure, and wherein the rigid support piece is configured to provide a region of mechanical support for a portion of the electrical trace ribbon.

10. The head gimbal assembly of claim 9, wherein a top surface of the slider is coupled to a bottom surface of the slider support region.

11. The head gimbal assembly of claim 9, wherein a bottom surface of the gimbal is welded to a top surface of the slider support region at a plurality of locations along a first centerline, wherein a top surface of the gimbal is welded to a bottom surface of the load beam at a plurality of locations along a second centerline, wherein the first centerline is a centerline of the gimbal and the slider support region, wherein the second centerline is a centerline of the gimbal and the load beam, and wherein the first centerline and the second centerline are parallel lines in an x-direction of an x-z plane which divides the head gimbal assembly into two equally sized halves along the x-direction.

12. The head gimbal assembly of claim 9, wherein a maximum width of the gimbal is narrower than a maximum width of the slider support region.

13. The head gimbal assembly of claim 9, wherein a maximum width of the gimbal within a region of overlap of the gimbal and the slider support region is narrower than a width of the slider support region within the region of overlap of the gimbal and the slider support region.

14. The head gimbal assembly of claim 1, the load beam comprising a dimple, wherein the dimple protrudes from the load beam toward the slider and is configured to provide a pivot point for movement of the slider and transfer a preload force from the load beam to the slider.

15. The head gimbal assembly of claim 14, the flexure further comprising a slider support region, wherein the slider support region is configured to provide a surface for mounting the slider to the flexure, wherein a top surface of the slider is coupled to a bottom surface of the slider support region, wherein a bottom surface of the gimbal is welded to a top surface of the slider support region, wherein a top surface of the gimbal is welded to a bottom surface of the load beam, and wherein a bottom surface of the dimple physically contacts the top surface of the gimbal.

16. The head gimbal assembly of claim 15, the flexure further comprising a rigid support piece, wherein the rigid support piece is configured to provide a region of mechanical support for a portion of the electrical trace ribbon, wherein the slider support region is joined to the rigid support piece by a portion of the electrical trace ribbon across a sag bend, and wherein the rigid support piece is coupled to the load beam.

* * * * *